US012608447B2

(12) United States Patent
Uflacker et al.

(10) Patent No.: US 12,608,447 B2
(45) Date of Patent: Apr. 21, 2026

(54) DETECTING ANOMALIES IN TIME SERIES DATA

(71) Applicant: SAP SE, Walldorf (DE)

(72) Inventors: Matthias Uflacker, Erding (DE); Dipti Shankar, Munich (DE); Maximilian Eckert, Munich (DE)

(73) Assignee: SAP SE, Walldorf (DE)

( * ) Notice: Subject to any disclaimer, the term of this patent is extended or adjusted under 35 U.S.C. 154(b) by 688 days.

(21) Appl. No.: 18/066,920

(22) Filed: Dec. 15, 2022

(65) Prior Publication Data

US 2024/0202283 A1      Jun. 20, 2024

(51) Int. Cl.
| | |
|---|---|
| *G06F 18/22* | (2023.01) |
| *G06F 18/2113* | (2023.01) |
| *G06F 123/02* | (2023.01) |

(52) U.S. Cl.
CPC .......... G06F 18/22 (2023.01); G06F 18/2113 (2023.01); *G06F 2123/02* (2023.01)

(58) Field of Classification Search
CPC .............................. G06F 18/22; G06F 18/2113
See application file for complete search history.

(56) References Cited

U.S. PATENT DOCUMENTS

| | | | | |
|---|---|---|---|---|
| 9,942,255 | B1 * | 4/2018 | MacDermed ....... | H04L 63/1466 |
| 2020/0053108 | A1 * | 2/2020 | Cili ..................... | G06F 18/2113 |
| 2020/0380409 | A1 * | 12/2020 | Seo ......................... | G06N 20/00 |
| 2021/0264332 | A1 * | 8/2021 | Pingali ................... | G06N 5/022 |
| 2022/0342861 | A1 * | 10/2022 | Gonzalez Macias ........................ G06F 16/24568 |
| 2023/0315840 | A1 * | 10/2023 | Cambric ................. | G06F 21/34 726/23 |
| 2023/0325064 | A1 * | 10/2023 | Woodhull ............... | H04L 43/20 |
| 2024/0143433 | A1 * | 5/2024 | Verma ................... | G06F 11/079 |

OTHER PUBLICATIONS

Wikipedia Time Series, 15 pages , archived Nov. 27, 2022. (Year: 2022).*
Taropa et al., WO-2021061090-A1, 78 pages, published Apr. 1, 2021. (Year: 2021).*

* cited by examiner

*Primary Examiner* — Barbara M Level
(74) *Attorney, Agent, or Firm* — Fountainhead Law Group, PC

(57)      ABSTRACT

Some embodiments provide a non-transitory machine-readable medium that stores a program. The program may receive a set of data from a data source. The program may generate a plurality of time series data based on the set of data. The program may determine a subset of the plurality of time series data as anomalies. The program may provide notifications indicating that the subset of the plurality of time series data are anomalies.

17 Claims, 7 Drawing Sheets

500

Ranked Anomaly Data

| Page Views | Country | Website | Timestamp | Relevance |
|---|---|---|---|---|
| 5 | Germany | www.website1.com | 2022-1-1 | 0.1 |
| 47 | Germany | www.website2.com | 2022-1-1 | 0.6 |
| 52 | Germany | | 2022-1-1 | 0.8 |

505
510
515

200

External Data

| Page Views | Country | Website | Timestamp |
|---|---|---|---|
| 23 | USA | www.website1.com | 2022-1-1 |
| 5 | Germany | www.website1.com | 2022-1-1 |
| 3 | USA | www.website2.com | 2022-1-1 |
| 47 | Germany | www.website2.com | 2022-1-1 |

Time Series Data

| Page Views | Country | Website | Timestamp |
|---|---|---|---|
| 23 | USA | www.website1.com | 2022-1-1 |
| 5 | Germany | www.website1.com | 2022-1-1 |
| 3 | USA | www.website2.com | 2022-1-1 |
| 47 | Germany | www.website2.com | 2022-1-1 |
| 26 | USA | | 2022-1-1 |
| 52 | Germany | | 2022-1-1 |
| 28 | | www.website1.com | 2022-1-1 |
| 50 | | www.website2.com | 2022-1-1 |
| 78 | | | 2022-1-1 |

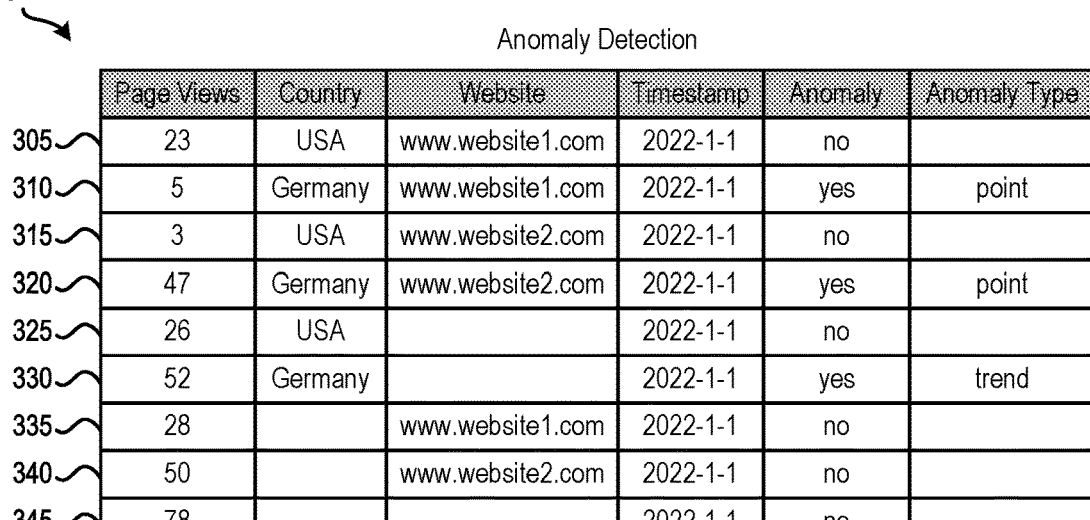

Anomaly Detection

| | Page Views | Country | Website | Timestamp | Anomaly | Anomaly Type |
|---|---|---|---|---|---|---|
| 305 | 23 | USA | www.website1.com | 2022-1-1 | no | |
| 310 | 5 | Germany | www.website1.com | 2022-1-1 | yes | point |
| 315 | 3 | USA | www.website2.com | 2022-1-1 | no | |
| 320 | 47 | Germany | www.website2.com | 2022-1-1 | yes | point |
| 325 | 26 | USA | | 2022-1-1 | no | |
| 330 | 52 | Germany | | 2022-1-1 | yes | trend |
| 335 | 28 | | www.website1.com | 2022-1-1 | no | |
| 340 | 50 | | www.website2.com | 2022-1-1 | no | |
| 345 | 78 | | | 2022-1-1 | no | |

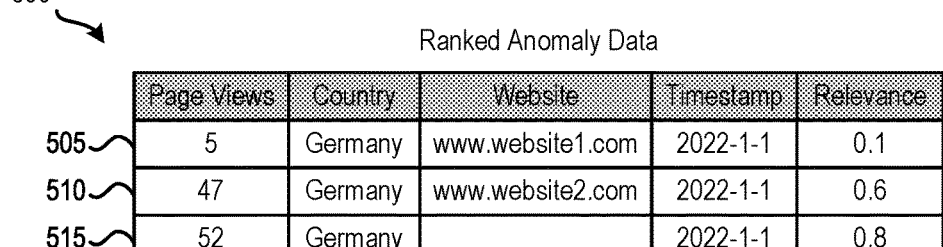

Ranked Anomaly Data

| | Page Views | Country | Website | Timestamp | Relevance |
|---|---|---|---|---|---|
| 505 | 5 | Germany | www.website1.com | 2022-1-1 | 0.1 |
| 510 | 47 | Germany | www.website2.com | 2022-1-1 | 0.6 |
| 515 | 52 | Germany | | 2022-1-1 | 0.8 |

FIG. 5

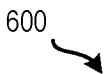
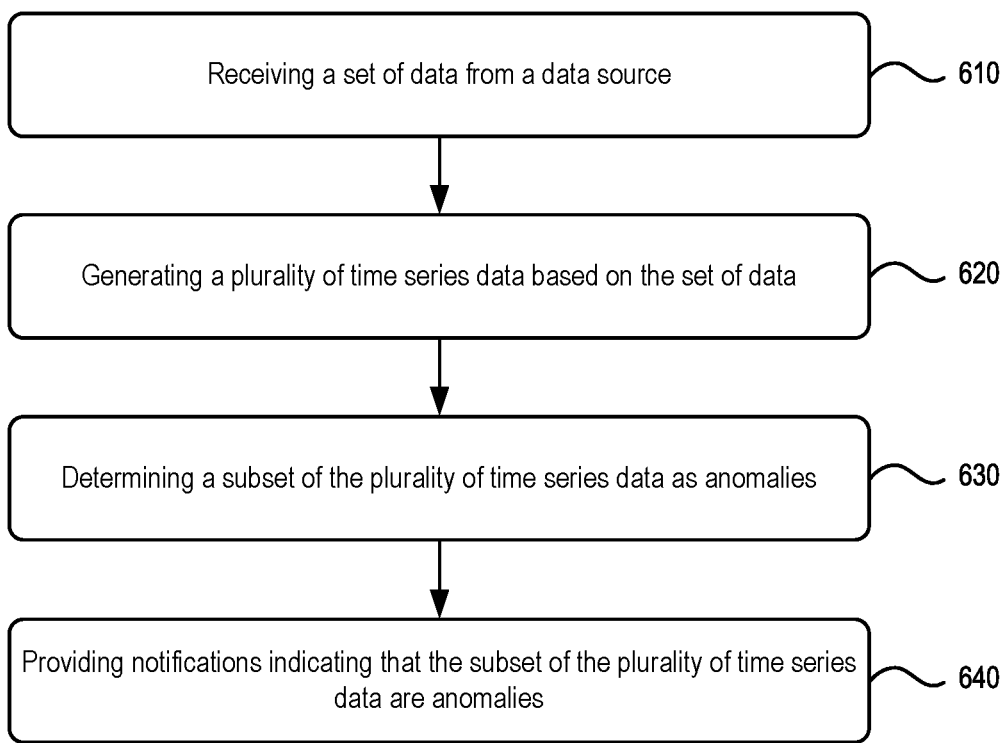
Receiving a set of data from a data source ～ 610
Generating a plurality of time series data based on the set of data ～ 620
Determining a subset of the plurality of time series data as anomalies ～ 630
Providing notifications indicating that the subset of the plurality of time series data are anomalies ～ 640
FIG. 6

DETECTING ANOMALIES IN TIME SERIES DATA

BACKGROUND

Time series data is a series of data points indexed chronologically. Typically, a set of time series data is a sequence of data points taken at successive equally spaced instances in time (e.g., a regular time series). That is, a set of time series data is a sequence of discrete-time data. Examples of time series are daily prices of a stock, annual retail sales, daily temperatures at a geographical location, the number of monthly subscribers of a service, etc. There are many applications based on time series data. For instance, time series data can be analyzed in order to learn meaningful statistics and/or insights from the data. As another example, time series data may be utilized to predict future values based on previously observed values. Interrupted time series analysis can be used to detect changes in the evolution of a time series from before to after some intervention.

SUMMARY

In some embodiments, the techniques described herein relate to a non-transitory machine-readable medium storing a program executable by at least one processing unit of a device, the program including sets of instructions for: receiving a set of data from a data source; generating a plurality of time series data based on the set of data: determining a subset of the plurality of time series data as anomalies: and providing notifications indicating that the subset of the plurality of time series data are anomalies.

In some embodiments, the techniques described herein relate to a non-transitory machine-readable medium, wherein the set of data includes a measure organized according to a set of dimensions, wherein generating the plurality of time series data based on the set of data includes generating a first time series data based on a first subset of the set of dimensions and generating a second time series data based on a second subset of the set of dimensions.

In some embodiments, the techniques described herein relate to a non-transitory machine-readable medium, wherein generating the first time series data in the plurality of time series data based on the set of data includes aggregating the set of data into a first set of intervals of time.

In some embodiments, the techniques described herein relate to a non-transitory machine-readable medium, wherein generating the second time series data in the plurality of time series data based on the set of data includes aggregating the set of data into a second set of intervals of time.

In some embodiments, the techniques described herein relate to a non-transitory machine-readable medium, wherein the program further includes sets of instructions for: determining a relevance score for each time series data in the subset of the plurality of time series data: and ranking the subset of the plurality of time series data based on the relevance scores.

In some embodiments, the techniques described herein relate to a non-transitory machine-readable medium, wherein the relevance score for a particular time series data in the subset of the plurality of time series data is determined based on a set of factors.

In some embodiments, the techniques described herein relate to a non-transitory machine-readable medium, wherein determining the subset of the plurality of time series data as anomalies includes: using a first anomaly detector configured to determine that a datum in the subset of the plurality of time series data is a trend anomaly: and using a second anomaly detector configured to determine that the datum in the subset of the plurality of time series data is a point anomaly.

In some embodiments, the techniques described herein relate to a method including: receiving a set of data from a data source: generating a plurality of time series data based on the set of data: determining a subset of the plurality of time series data as anomalies: and providing notifications indicating that the subset of the plurality of time series data are anomalies.

In some embodiments, the techniques described herein relate to a method, wherein the set of data includes a measure organized according to a set of dimensions, wherein generating the plurality of time series data based on the set of data includes generating a first time series data based on a first subset of the set of dimensions and generating a second time series data based on a second subset of the set of dimensions.

In some embodiments, the techniques described herein relate to a method, wherein generating the first time series data in the plurality of time series data based on the set of data includes aggregating the set of data into a first set of intervals of time.

In some embodiments, the techniques described herein relate to a method, wherein generating the second time series data in the plurality of time series data based on the set of data includes aggregating the set of data into a second set of intervals of time.

In some embodiments, the techniques described herein relate to a method further including: determining a relevance score for each time series data in the subset of the plurality of time series data: and ranking the subset of the plurality of time series data based on the relevance scores.

In some embodiments, the techniques described herein relate to a method, wherein the relevance score for a particular time series data in the subset of the plurality of time series data is determined based on a set of factors.

In some embodiments, the techniques described herein relate to a method, wherein determining the subset of the plurality of time series data as anomalies includes: using a first anomaly detector configured to determine that a datum in the subset of the plurality of time series data is a trend anomaly: and using a second anomaly detector configured to determine that the datum in the subset of the plurality of time series data is a point anomaly.

In some embodiments, the techniques described herein relate to a system including: a set of processing units: and a non-transitory machine-readable medium storing instructions that when executed by at least one processing unit in the set of processing units cause the at least one processing unit to: receive a set of data from a data source: generate a plurality of time series data based on the set of data: determine a subset of the plurality of time series data as anomalies: and provide notifications indicating that the subset of the plurality of time series data are anomalies.

In some embodiments, the techniques described herein relate to a system, wherein the set of data includes a measure organized according to a set of dimensions, wherein generating the plurality of time series data based on the set of data includes generating a first time series data based on a first subset of the set of dimensions and generating a second time series data based on a second subset of the set of dimensions.

In some embodiments, the techniques described herein relate to a system, wherein generating the first time series data in the plurality of time series data based on the set of data includes aggregating the set of data into a first set of intervals of time.

In some embodiments, the techniques described herein relate to a system, wherein generating the second time series data in the plurality of time series data based on the set of data includes aggregating the set of data into a second set of intervals of time.

In some embodiments, the techniques described herein relate to a system, wherein the instructions further cause the at least one processing unit to: determine a relevance score for each time series data in the subset of the plurality of time series data: and rank the subset of the plurality of time series data based on the relevance scores.

In some embodiments, the techniques described herein relate to a system, wherein the relevance score for a particular time series data in the subset of the plurality of time series data is determined based on a set of factors.

The following detailed description and accompanying drawings provide a better understanding of the nature and advantages of various embodiments of the present disclosure.

BRIEF DESCRIPTION OF THE DRAWINGS

FIG. 2 illustrates an example set of external data according to some embodiments.

FIG. 3 illustrates time series data generated based on the set of external data illustrated in FIG. 2 according to some embodiments.

FIG. 4 illustrates anomaly detection applied to the time series data illustrated in FIG. 3 according to some embodiments.

FIG. 5 illustrates the anomalies detected in the time series data illustrated in FIG. 4 ranked based on relevance according to some embodiments.

FIG. 6 illustrates a process for detecting anomalies in time series data according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for detecting anomalies in time series data. In some embodiments, a computing system may be communicatively coupled to one or more data sources. Each data source can store data organized according to measures and dimensions. From data stored in each data source, the computing system may generate different sets of time series data. For instance, the computing system can generate different sets of time series data that have different time intervals. For a given measure in the data, the computing system may generate different sets of time series data for different combinations of dimensions used to organize the measure values. For each set of time series data, the computing system can use different types of anomaly detectors to detect anomalies in the set of time series data. Next, the computing system determines the relevance of the detected anomalies based on a set of defined factors and ranks the anomalies based on the relevance. Finally, the computing system can provide a client device with notifications regarding the ranked anomalies. The computing system may repeatedly and automatically retrieve new data from each data source, process the new data in the manner described above, and append the processed data (e.g., the most recent measurements) to the corresponding time series. In this manner, the computing system can continuously monitor data in the data sources and provide a near real-time detection of anomalies.

Figure 1:
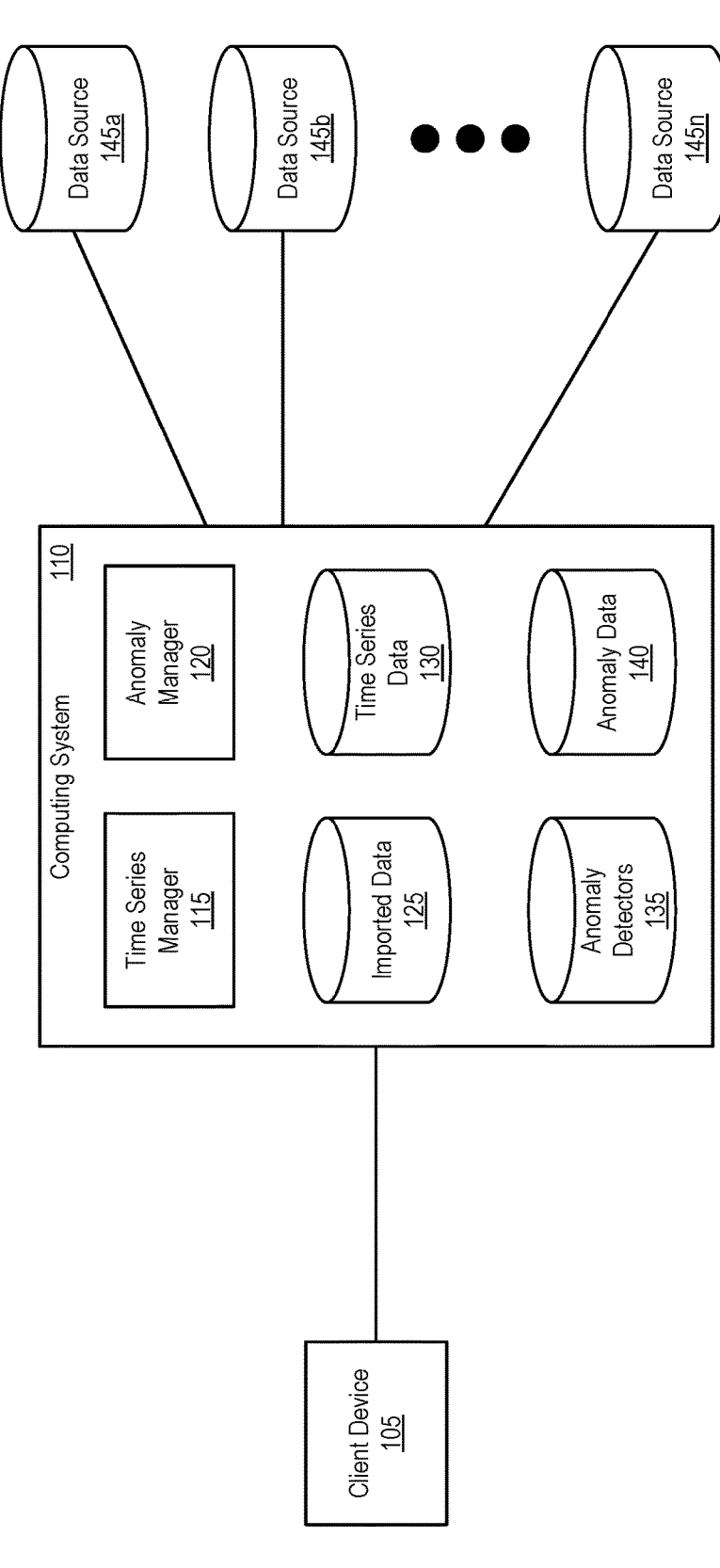
FIG. 1 illustrates a system for detecting anomalies in time series data according to some embodiments.

FIG. 1 illustrates a system 100 for detecting anomalies in time series data according to some embodiments. As shown, system 100 includes client device 105, computing system 110, and data sources 145a-n. Client device 105 is configured to interact and communicate with computing system 110. For example, a user of client device 105 can send computing system 110 selections of measures and/or dimensions of interest. Based on the selections, the user of client device 105 may receive notifications regarding anomalies in time series data from computing system. Each of the data sources 145a-n is configured to store data organized according to measures and dimensions. In some such embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, each of the data sources 145a-n is part of a separate computing system. In other embodiments, one or more data sources 145a-n may be implemented together on the same computing system. Although FIG. 1 shows data sources 145a-n as being external to computing system 110, one or more data sources 145a-n can be included in computing system 110 in some embodiments.

As illustrated in FIG. 1, computing system 110 includes time series manager 115, anomaly manager 120, and storages 125-140. Imported data storage 125 is configured to store data imported from data sources 145a-n. Time series data storage 130 stores sets of time series data. Anomaly detectors storage 135 is configured to store different anomaly detectors for detecting anomalies in time series data. Anomaly data storage 140 stores detected anomalies in time series data. In some embodiments, storages 125-140 are implemented in a single physical storage while, in other embodiments, storages 125-140) may be implemented across several physical storages. While FIG. 1 shows storages 125-140 as part of computing system 110, one of ordinary skill in the art will appreciate that imported data storage 125, time series data storage 130, anomaly detectors storage 135, and/or anomaly data storage 140 may be external to computing system 110 in some embodiments.

Time series manager 115 is responsible for managing time series data. For instance, at defined intervals, time series manager 115 retrieves data from a data source 145 and generates different sets of time series data from the retrieved data. As an example, time series manager 115 may access a data source 145 to retrieve data having a timestamp that falls within a given interval of time (e.g., a particular hour, a particular day, a particular month, a particular year, etc.) and store the retrieved data in imported data storage 125. Based on the data falling within in the given interval of time, time series manager 115 generates different sets of time series data for different permutations of dimensions and/or measures. Then, time series manager 115 stores the generated sets of time series data in time series data storage 130.

Anomaly manager 120 handles the detection and management of anomalies in time series data. For example, anomaly manager 120) may access time series data storage 130 to retrieve a set of time series data. Next, anomaly manager 120 accesses anomaly detectors storage 135 to retrieve a set of anomaly detectors associated with the set of time series data. Anomaly manager 120 then uses each anomaly detectors in the set of anomaly detectors to determine whether the set of time series data contains any anomalies. Different anomaly detectors can be configured to detect different types of anomalies. Examples of types of anomalies include point anomalies, trend anomalies, etc. Anomaly manager 120 stores any detected anomalies in the set of time series data in anomaly data storage 140. In addition, anomaly manager 120 may generate notifications indicating that anomalies occurred in the set of time series data and provide the notifications to an intended recipient (e.g., a user of client device 105).

An example operation of system 100 will now be described by reference to FIGS. 1-5. The example operation will demonstrate how time series data is generated from data stored in a data source and how anomalies are detected in the time series data. The operation starts by time series manager 115 accessing data source 145b to retrieve data having a timestamp that falls within a particular day (Jan. 1, 2022 in this example). Time series manager 115 stores the retrieved data in imported data storage 125. FIG. 2 illustrates an example set of external data 200 according to some embodiments. For this example, the set of external data 200 is the data that time series manager 115 retrieves from data source 145b. As shown, the set of external data 200 includes four records 205-220. Each of the records 205-220 includes a measure value for a page view measure, a dimension value for a country dimension, a dimension value for a website dimension, and a value for a timestamp. The country dimension and the website dimension are used to organize the page view measure.

After retrieving the set of external data 200 from data source 145b and storing it in imported data storage 125, time series manager 115 generates several sets of discrete-time time series data from the set of external data 200. In this example, time series manager 115 generates a set of time series data per day for each possible combination of the values for the country dimension and the website dimension. FIG. 3 illustrates time series data 300 generated based on the set of external data 200 according to some embodiments. Specifically, time series data 300 shows all the different sets of time series data that time series manager 115 generates from the set of external data 200 for this example. As depicted, time series data 300 includes eight records 305-345. Records 305-320 are the same as records 205-220, respectively. Record 325 includes the total number of page views that occurred in the country of USA on the specified date. Time series manager 115 generates record 325 by aggregating the page view values of all the records in records 205-220 with a country dimension value of USA. Record 330 includes the total number of page views that occurred in the country of Germany. Similarly, time series manager 115 generates record 330 by aggregating the page view values of all the records in records 205-220 with a country dimension value of Germany. Record 335 includes the total number of page views that occurred at the website www.website1.com. Time series manager 115 generates record 335 by aggregating the page view values of all the records in records 205-30) 220) with a website dimension value of www.website1.com. Record 340 includes the total number of page views that occurred at the website www.website2.com. Time series manager 115 generates record 340) by aggregating the page view values of all the records in records 205-220 with a website dimension value of www.website2.com. Record 345 includes the total number of page views that occurred on Jan. 1, 2022. Time series manager 115 generates record 345 by aggregating the page view values of all the records in records 205-220. As such, time series manager 115 generated a set of time series data for each possible combination of dimension values for the country dimension and the website dimension per day. Once time series manager 115 generates time series data 300, time series manager 115 stores them in time series data storage 130.

Continuing with the example, anomaly manager 120 accesses time series data storage 130 to retrieve time series data 300. Next, anomaly manager 120 accesses anomaly detectors storage 135 to retrieve anomaly detectors associated with time series data 300. Here, an anomaly detector configured to detect point anomalies and an anomaly detector configured to detect trend anomalies are used for detecting anomalies in each record of time series data 300. In some embodiments, an anomaly detector configured to detect point anomalies employs an exponential smoothing technique to determine that a datum in a time series data (e.g., a record in time series data 300) is a point anomaly. In particular, such an anomaly detector detects point anomalies by generating a model based on previous measure values in a time series. For example, an anomaly detector that detects point anomalies based on page views that occurred at the website www.website1.com and in the USA (e.g., record 305) can use an exponential smoothing technique to generate a model based on the previous days of page views that occurred at the website www.website1.com and in the USA (e.g., page views that occurred at the website www.website1.com and in the USA on Dec. 1, 2021, Dec. 2, 2021, . . . , and Dec. 31, 2021). The anomaly detector uses the generated model to predict the next measure value (i.e., the number of page views that will occur at the website www.website1.com and in the USA on Jan. 1, 2022). Then, the anomaly detector compares the predicted measure value with the actual measure value. Based on the comparison, the anomaly detector determines whether the actual measure value is an anomaly. Then, the anomaly detector updates the generated model with the actual measure value. Updating the model allows the anomaly detector to predict the measure value for the subsequent measure value in the time series (e.g., the number of page views that will occur at the website www.website1.com and in the USA on Jan. 2, 2022).

In some embodiments, an anomaly detector configured to detect trend anomalies employs a Mann Kendall trend test to determine that a datum in a time series data is a trend anomaly. Specifically, this type of anomaly detector detects trend anomalies by maintaining a history of results from applying the Mann Kendall trend test on a time series and determining that a trend anomaly occurs when there is a change in the results (e.g., if a trend now exists when there previously was no trend, if an existing trend ceases to exist, if a decreasing trend turns into an increasing trend, etc.). For instance, an anomaly detector that detects trend anomalies based on page views that occurred in the USA (e.g., record 325) can maintain a history of results from applying the Mann Kendall trend test on the time series (e.g., results from applying the Mann Kendall trend test on page views that occurred in the USA from Dec. 1, 2021 to Dec. 28, 2021, from Dec. 1, 2021 to Dec. 29, 2021, from Dec. 1, 2021 to Dec. 30, 2021, and from Dec. 1, 2021 to Dec. 31, 2021). The anomaly detector can then apply the Mann Kendall trend test on page views that occurred in the USA from Dec. 1, 2021 to Jan. 1, 2022. If this result is different than the result from applying the Mann Kendall trend test on page views that occurred in the USA from Dec. 1, 2021 to Dec. 31, 2021, the anomaly detector determines that a trend anomaly exists. Otherwise, the anomaly detector determines that no trend anomaly exists.

In this example, anomaly manager 120 retrieves, from anomaly detectors storage 135, these two types of anomaly detectors for each of the records 305-345 (for a total of eighteen anomaly detectors). Then, for each of the records 305-345, anomaly manager 120 uses the two types of anomaly detectors associated with the record to detect whether the record is an anomaly.

FIG. 4 illustrates anomaly detection applied to time series data 300 according to some embodiments. In particular, FIG. 4 shows, for each of the records 305-345 in time series data 300, whether the record is detected as an anomaly and the type of anomaly detector used. As illustrated, records 310, 320, and 330 are detected as anomalies in this example. Records 310 and 320 are determined to be point anomalies (e.g., a spike, a drop, etc.) while record 330 is determined to be a trend anomaly (e.g., increasing trend, decreasing trend, etc.). Anomaly manager 120 then determines a relevance score for each of the detected anomalies based on a set of factors and then ranks the anomalies according to the relevance scores. In some embodiments, anomaly manager 120 uses different sets of factors for different types of detected anomalies. For example, in some such embodiments, anomaly manager 120 uses the following equation (1) to determine a relevance score for point anomalies:

$$relevance(A) = w_{deviation} * \text{relative deviation}(A) +$$
$$w_{support} * \text{support}(A) + w_{risk\ ratio} * \text{risk ratio}(A)$$

where weights $w_{deviation}$, $w_{support}$, and $w_{risk\ ratio}$ are configurable and sum up to 1 and the resulting relevance score is a number between 0 (e.g., not relevant at all) and 1 (e.g., most relevant). Relative deviation(A) represents how much the actual value deviates from what was expected. Support (A) can be determined using the following equation (2):

$$support(A) = \frac{m}{n}$$

where m is the number of anomalies containing the same attributes (e.g., measures and dimensions) as A and n is total number of anomalies. Risk ratio(A) represents the ratio of the likeliness that a datapoint that contains this attribute combination is anomalous (a) to the likeliness that a datapoint that does not contain the attribute combination is anomalous. Risk ratio(A) may be determined using the following equation (3):

$$risk\ ratio(A) = \frac{a}{b}, \text{where } a =$$
$$\frac{\text{number of anomolies containing the same attributes as } A}{\text{total number of datapoints containing the same attributes as } A},$$
$$b = \frac{\text{number of anomolies containing the same attributes as } A}{\substack{\text{total number of datapoints not containing} \\ \text{the same attributes as } A}}$$

In some embodiments, anomaly manager 120 uses the following equation (4) to determine a relevance score for trend anomalies:

$$relevance(A) =$$
$$w_{slopee} * \text{slope}(A) + w_{support} * \text{support}(A) + w_{measure\ value} * \text{measure value}(A)$$

where weights $w_{slope}$, $w_{support}$, and $w_{measure\ value}$ are configurable and sum up to 1 and the resulting relevance score is a number between 0 (e.g., not relevant at all) and 1 (e.g., most relevant). Slope(A) represents the slope of the trend. Support(A) can be determined using the above-mentioned equation (2). Measure value(A) is the absolute value of the measure. Upon determining the relevance scores for records 310, 320, and 330, anomaly manager 120 stores these ranked records in anomaly data storage 140. In some embodiments, anomaly manager 120 stores the anomaly variables in equations (2) and (3) in anomaly data storage 140. Anomaly manager 120 can also store anomaly-specific information (e.g., the slope of a trend for trend anomalies) in anomaly data storage 140 in some cases. FIG. 5 illustrates the anomalies detected in time series data 300 illustrated in FIG. 4 ranked based on relevance. As shown, ranked anomalies 500 includes records 505, 510, and 515, which correspond to records 310, 320, and 330 in FIG. 4, respectively. Additionally, anomaly manager 120 generates notifications (e.g., emails, application messages, text messages, etc.) indicating that these records are determined to be anomalies. Anomaly manager 120 may provide the notifications to an intended recipient (e.g., a user of client device 105).

An anomaly detector configured to be used on data stored in a particular data source 145 for a particular interval of time relies on the historical data associated with successive time intervals to detect whether the data associated with a current time interval is an anomaly. As such, after anomaly manager 120 performs anomaly detection on each of the records 305-345, anomaly manager 120 may update the anomaly detectors stored in anomaly detectors storage 135 with time series data 300. This way, the anomaly detectors can be used on data associated with future time intervals.

Computing system 110 uses the same techniques shown in the example operation to process data for previous successive time intervals (e.g., the day of Dec. 28, 2021, the day of Dec. 29, 2021, the day of Dec. 30, 2021, etc.). In addition, computing system 110 is configured to use the same techniques to process data for successive future time intervals (e.g., the day of Jan. 2, 2022, the day of Jan. 3, 2022, etc.). Computing system 110 may be configured to process data stored in data source 145b for different time intervals. For example, computing system 110 can use the same techniques to generate hourly time series data, monthly time series data, yearly time series data, etc. Furthermore, computing system 110 can use the same techniques to process data stored in the other data sources 145a and 145c-n.

FIG. 6 illustrates a process 600 for detecting anomalies in time series data according to some embodiments. In some embodiments, computing system 110 performs process 600. Process 600 begins by receiving, at 610, a set of data from a data source. Referring to FIGS. 1 and 2 as an example, time series manager 115 can receive the set of external data 200 from data source 145*b*.

Next, process 600 generates, at 620, a plurality of time series data based on the set of data. Referring to FIGS. 1 and 3 as an example, time series manager 115 generates records 305-345 in time series data 300 based on the set of external data 200. Process 600 then determines, at 630, a subset of the plurality of time series data as anomalies. Referring to FIGS. 1 and 4 as an example, anomaly manager 120 accesses anomaly detectors storage 135 to retrieve anomaly detectors associated with time series data 300. Then, anomaly manager 120 uses the retrieved anomaly detectors to detect whether each of the records 305-345 is an anomaly, as indicated in the time series data 300 depicted in FIG. 4.

Finally, process 600 provides, at 640, notifications indicating that the subset of the plurality of time series data are anomalies. Referring to FIGS. 1 and 5 as an example, FIG. 5 illustrates ranked anomalies 500. Anomaly manager 120 can generate notifications (e.g., emails, application messages, text messages, etc.) indicating that the records in ranked anomalies are determined to be anomalies and provide them to an intended recipient (e.g., a user of client device 105).

Figure 7:
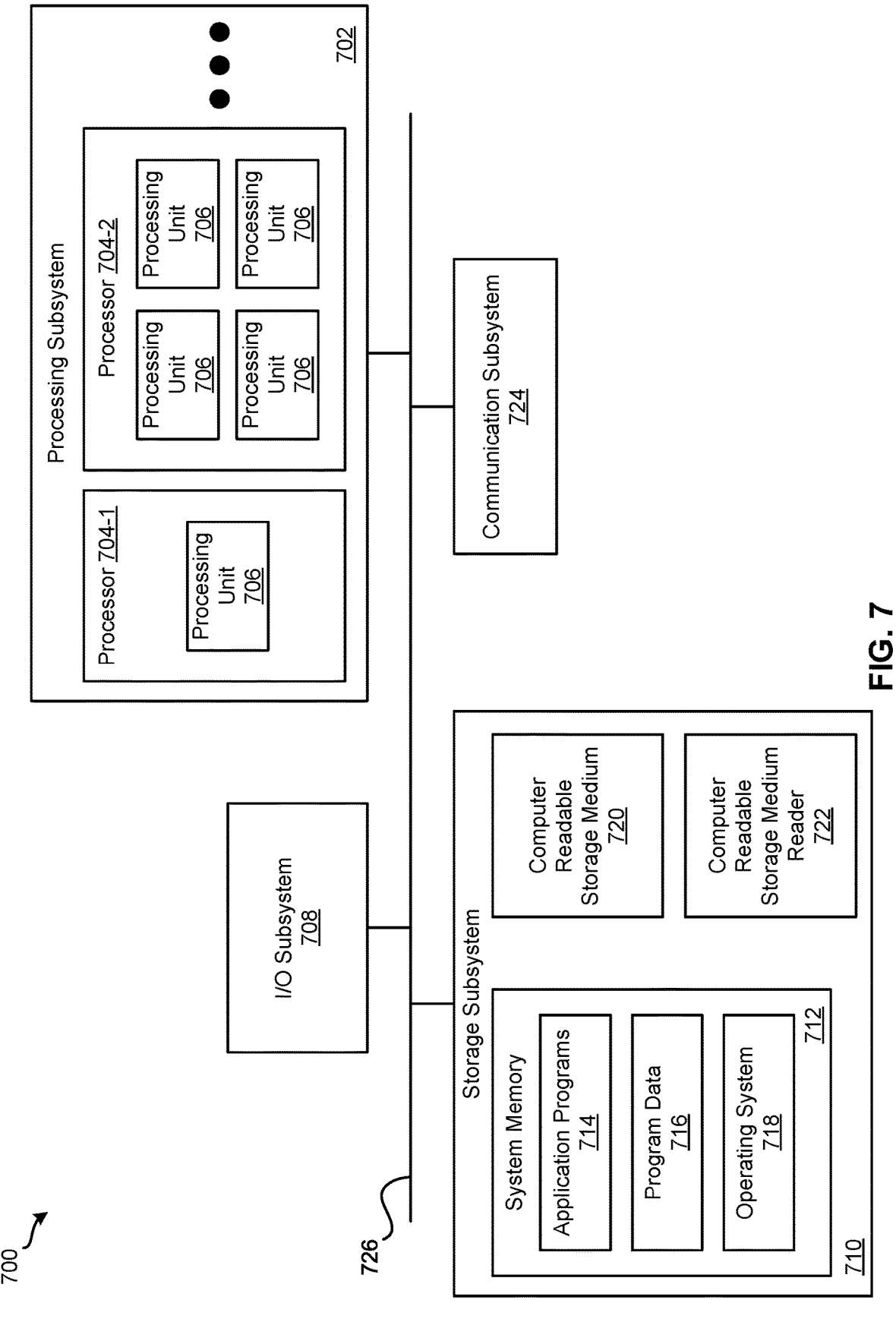
FIG. 7 illustrates an exemplary computer system, in which various embodiments may be implemented.

FIG. 7 illustrates an exemplary computer system 700 for implementing various embodiments described above. For example, computer system 700 may be used to implement client device 105 and computing system 110. Computer system 700 may be a desktop computer, a laptop, a server computer, or any other type of computer system or combination thereof. Some or all elements of time series manager 115, anomaly manager 120, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714, program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome R: OS, and the like)

and/or mobile operating systems such as Apple iOS, Windows Phone, Windows Mobile, Android, BlackBerry OS, Blackberry 10, and Palm OS, WebOS operating systems.

Computer-readable storage medium 720) may be a nontransitory computer-readable medium configured to store software (e.g., programs, code modules, data constructs, instructions, etc.). Many of the components (e.g., time series manager 115 and anomaly manager 120) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
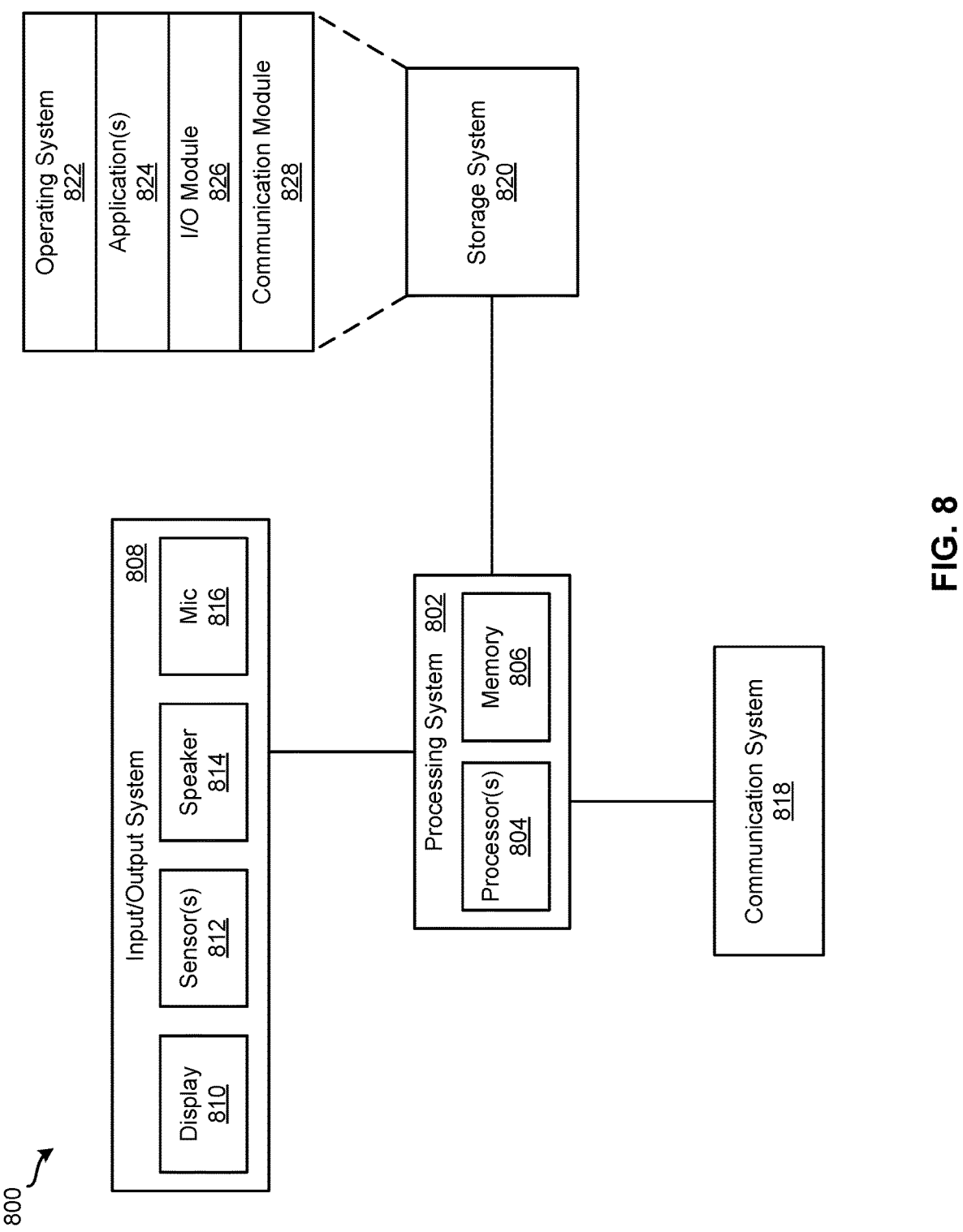
FIG. 8 illustrates an exemplary computing device, in which various embodiments may be implemented.

FIG. 8 illustrates an exemplary computing device 800 for implementing various embodiments described above. For example, computing device 800 may be used to implement client device 105. Computing device 800 may be a cell-phone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrated into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome R: OS, and the like) and/or mobile operating systems such as Apple IOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module

828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
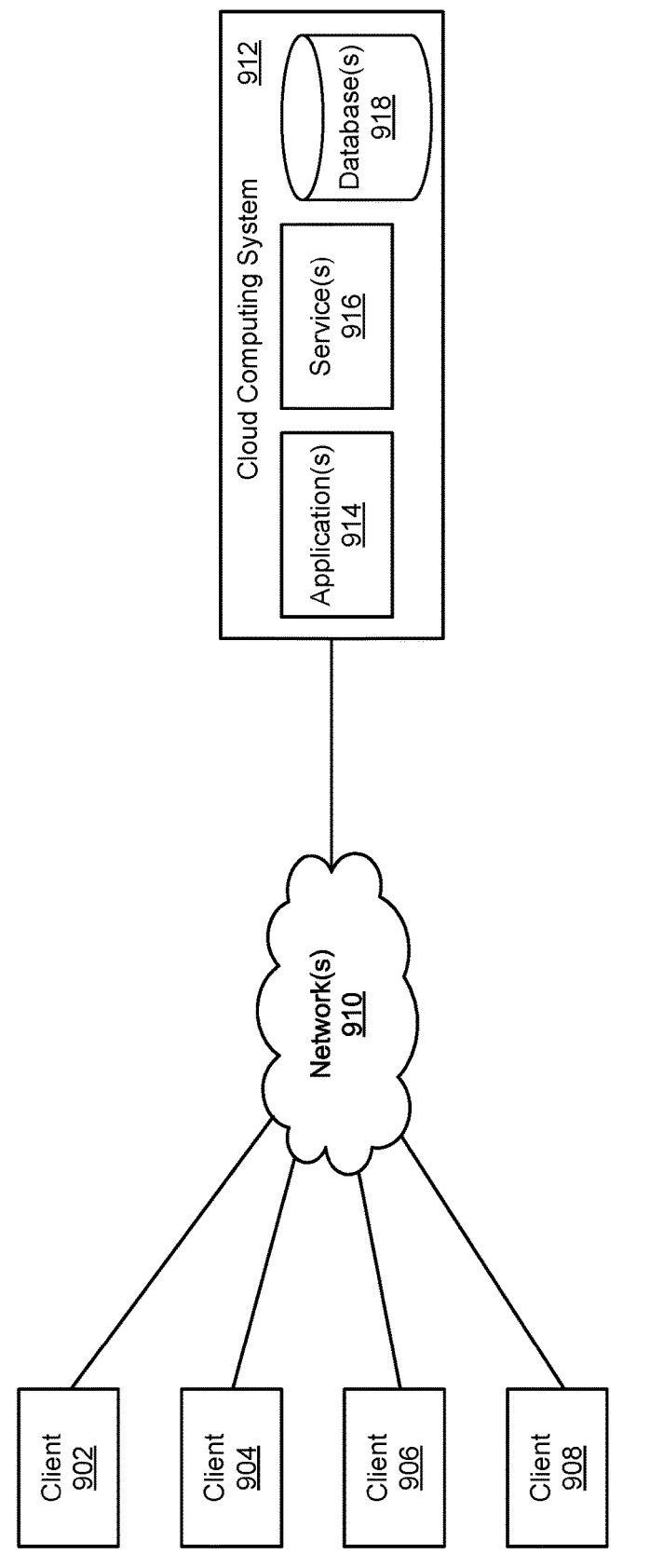
FIG. 9 illustrates an exemplary system, in which various embodiments may be implemented.

FIG. 9 illustrates an exemplary system 900 for implementing various embodiments described above. For example, one of the client devices 902-908 may be used to implement client device 105 and cloud computing system 912 may be used to implement computing system 110. As shown, system 900 includes client devices 902-908, one or more networks 910, and cloud computing system 912. Cloud computing system 912 is configured to provide resources and data to client devices 902-908 via networks 910. In some embodiments, cloud computing system 912 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 912 may provide applications 914, services 916, and databases 918 to any number of different customers in a self-service, subscription-based, elastically scalable, reliable, highly available, and secure manner.

In some embodiments, cloud computing system 912 may be adapted to automatically provision, manage, and track a customer's subscriptions to services offered by cloud computing system 912. Cloud computing system 912 may provide cloud services via different deployment models. For example, cloud services may be provided under a public cloud model in which cloud computing system 912 is owned by an organization selling cloud services and the cloud services are made available to the general public or different industry enterprises. As another example, cloud services may be provided under a private cloud model in which cloud computing system 912 is operated solely for a single organization and may provide cloud services for one or more entities within the organization. The cloud services may also be provided under a community cloud model in which cloud computing system 912 and the cloud services provided by cloud computing system 912 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transfer protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 125-140 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 912. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
  receiving a set of data from a data source;
  generating a plurality of time series data based on the set of data;
  determining a subset of the plurality of time series data as anomalies by applying a Mann Kendall trend test to determine a datum in one of the plurality of time series data is a trend anomaly;
  determining a relevance score for each time series data in the subset of the plurality of time series data;
  ranking the subset of the plurality of time series data based on the relevance scores; and
  providing notifications indicating that the subset of the plurality of time series data are anomalies according to the ranking.

2. The non-transitory machine-readable medium of claim 1, wherein the set of data comprises a measure organized according to a set of dimensions, wherein generating the plurality of time series data based on the set of data comprises generating a first time series data based on a first subset of the set of dimensions and generating a second time series data based on a second subset of the set of dimensions.

3. The non-transitory machine-readable medium of claim 2, wherein generating the first time series data in the plurality of time series data based on the set of data comprises aggregating the set of data into a first set of intervals of time.

4. The non-transitory machine-readable medium of claim 3, wherein generating the second time series data in the plurality of time series data based on the set of data comprises aggregating the set of data into a second set of intervals of time.

5. The non-transitory machine-readable medium of claim 1, wherein the relevance score for a particular time series data in the subset of the plurality of time series data is determined based on a set of factors.

6. The non-transitory machine-readable medium of claim 1, wherein determining the subset of the plurality of time series data as anomalies comprises:
  using a second anomaly detector configured to determine that the datum in the subset of the plurality of time series data is a point anomaly.

7. A method comprising:
  receiving a set of data from a data source;
  generating a plurality of time series data based on the set of data;
  determining a subset of the plurality of time series data as anomalies by applying a Mann Kendall trend test to determine a datum in one of the plurality of time series data is a trend anomaly;
  determining a relevance score for each time series data in the subset of the plurality of time series data;
  ranking the subset of the plurality of time series data based on the relevance scores; and
  providing notifications indicating that the subset of the plurality of time series data are anomalies according to the ranking.

8. The method of claim 7, wherein the set of data comprises a measure organized according to a set of dimensions, wherein generating the plurality of time series data based on the set of data comprises generating a first time series data based on a first subset of the set of dimensions and generating a second time series data based on a second subset of the set of dimensions.

9. The method of claim 8, wherein generating the first time series data in the plurality of time series data based on the set of data comprises aggregating the set of data into a first set of intervals of time.

10. The method of claim 9, wherein generating the second time series data in the plurality of time series data based on the set of data comprises aggregating the set of data into a second set of intervals of time.

11. The method of claim 7, wherein the relevance score for a particular time series data in the subset of the plurality of time series data is determined based on a set of factors.

12. The method of claim 7, wherein determining the subset of the plurality of time series data as anomalies comprises:

using a second anomaly detector configured to determine that the datum in the subset of the plurality of time series data is a point anomaly.

13. A system comprising:

a set of processing units; and a non-transitory machine-readable medium storing instructions that when executed by at least one processing unit in the set of processing units cause the at least one processing unit to:

receive a set of data from a data source;

generate a plurality of time series data based on the set of data;

determine a subset of the plurality of time series data as anomalies by applying a Mann Kendall trend test to determine a datum in one of the plurality of time series data is a trend anomaly;

determining a relevance score for each time series data in the subset of the plurality of time series data;

ranking the subset of the plurality of time series data based on the relevance scores; and provide notifications indicating that the subset of the plurality of time series data are anomalies according to the ranking.

14. The system of claim 13, wherein the set of data comprises a measure organized according to a set of dimensions, wherein generating the plurality of time series data based on the set of data comprises generating a first time series data based on a first subset of the set of dimensions and generating a second time series data based on a second subset of the set of dimensions.

15. The system of claim 14, wherein generating the first time series data in the plurality of time series data based on the set of data comprises aggregating the set of data into a first set of intervals of time.

16. The system of claim 15, wherein generating the second time series data in the plurality of time series data based on the set of data comprises aggregating the set of data into a second set of intervals of time.

17. The system of claim 13, wherein the relevance score for a particular time series data in the subset of the plurality of time series data is determined based on a set of factors.

* * * * *